United States Patent
Walter et al.

(10) Patent No.: US 6,874,809 B1
(45) Date of Patent: Apr. 5, 2005

(54) LINING FOR COLUMNS OF AUTOMOBILES

(75) Inventors: Peter Walter, Margarethen (AT);
Richard Hahnekamp, Eisenstadt (AT);
Karl Steiner, Ebergassing (AT)

(73) Assignee: Magna Eybl GmbH, Ebergassing (AT)

( * ) Notice: Subject to any disclaimer, the term of this patent is extended or adjusted under 35 U.S.C. 154(b) by 0 days.

(21) Appl. No.: 09/979,541

(22) PCT Filed: May 5, 2000

(86) PCT No.: PCT/AT00/00123
§ 371 (c)(1),
(2), (4) Date: Mar. 8, 2002

(87) PCT Pub. No.: WO00/68041
PCT Pub. Date: Nov. 16, 2000

(30) Foreign Application Priority Data

May 6, 1999 (AT) ................................................ 817/99

(51) Int. Cl.⁷ ............................................. B60R 21/20
(52) U.S. Cl. ................................................. 280/728.3
(58) Field of Search .......................... 280/728.3, 730.2, 280/728.2; 296/39.1, 187

(56) References Cited

U.S. PATENT DOCUMENTS

| | | | | |
|---|---|---|---|---|
| 5,316,822 A | * | 5/1994 | Nishijima et al. | ..... 156/244.25 |
| 5,590,903 A | * | 1/1997 | Phillion et al. | .......... 280/728.3 |
| 5,901,976 A | * | 5/1999 | Kreuzer et al. | .......... 280/728.3 |
| 6,082,761 A | * | 7/2000 | Kato et al. | ................ 280/728.3 |
| 6,180,207 B1 | * | 1/2001 | Preisler et al. | ........... 280/728.3 |
| 6,333,515 B1 | * | 12/2001 | Kubota et al. | ........... 280/730.2 |

FOREIGN PATENT DOCUMENTS

| | | |
|---|---|---|
| EP | 0 857 624 | 8/1998 |
| EP | 0 872 390 | 10/1998 |
| EP | 0 894 679 | 2/1999 |

* cited by examiner

Primary Examiner—Faye M. Fleming
(74) Attorney, Agent, or Firm—Honigman Miller Schwartz and Cohn LLP

(57) ABSTRACT

The invention relates to a lining for columns of automobiles comprising a base area (1) with fixing and holding elements (4) and at least one opening area (2) covering, for example, an airbag (3). According to the invention, the opening area (2) consists largely of a thermoplastic material with a Shore A hardness of more than 100 and has a hinge area (6) consisting of a thermopolastic material with a Shore A hardness of less than 95, which adjoins the base area (1).

23 Claims, 1 Drawing Sheet

LINING FOR COLUMNS OF AUTOMOBILES

BACKGROUND OF THE INVENTION

Field of the Invention

The invention relates to a lining for columns of automobiles, comprising a base area with fixing and holding elements and at least one opening area, covering an airbag, for example.

In many automobiles of more recent design, it is common, in addition to the airbags which are arranged in the steering wheel cover or in the dashboard on the passenger's side, also to provide side airbags, as they are called, as a supplement, which may be integrated into the side lining of the automobile. For example, side airbags of this type are accommodated in the column lining of the automobiles.

In this connection, EP 0 894 679 A has disclosed a column lining for columns of automobiles which comprises at least one opening area and at least one fixing area.

In this case, the fixing area consists of a relatively hard thermoplastic from the group comprising polypropylene, acryl butadiene styrene copolymers and acryl butadiene styrene polycarbonate copolymers with a Shore A hardness greater than 100. On the other hand, the entire opening area consists of a softer thermoplastic with a preferred Shore A hardness of from 60 to 80. By using two thermoplastics of differing hardness, splintering of the column lining when the airbag is triggered or emerges is largely avoided.

One drawback is simply that the column linings in automobiles in particular are exposed to high temperature loadings or great temperature fluctuations, and the opening area consisting of a relatively soft thermoplastic material cannot meet the strict requirements with regard to dimensional stability.

SUMMARY OF THE INVENTION

It is an object of the invention to improve a column lining of the type mentioned at the beginning in such a way that adequate dimensional stability is ensured with simple means.

According to the invention, this object is achieved by the opening area consisting largely of a thermoplastic material with a Shore A hardness greater than 100 and having a hinge area, adjoining the base area, consisting of a thermoplastic material with a Shore A hardness of less than 95.

According to the invention, a large part of the opening area can thus consist of the same thermoplastic material as the base area and can be produced with the latter in one operation. Only a hinge area of the opening area, integrated into the base area, consists of a softer thermoplastic material with a Shore A hardness of less than 90. Since the majority of the opening area consists of the harder material, adequate dimensional stability of the lining part can be achieved.

If the hinge area does not reach as far as the edge of the respective lining part, according to the invention the opening area can be bounded by intended fracture lines, wall thickness reductions, etc. adjoining the hinge area.

A visually satisfactory appearance is ensured by the base area and the opening area, together with the hinge area, being covered by a unified decorative layer.

DESCRIPTION OF THE PREFERRED EMBODIMENT

Figure 1:
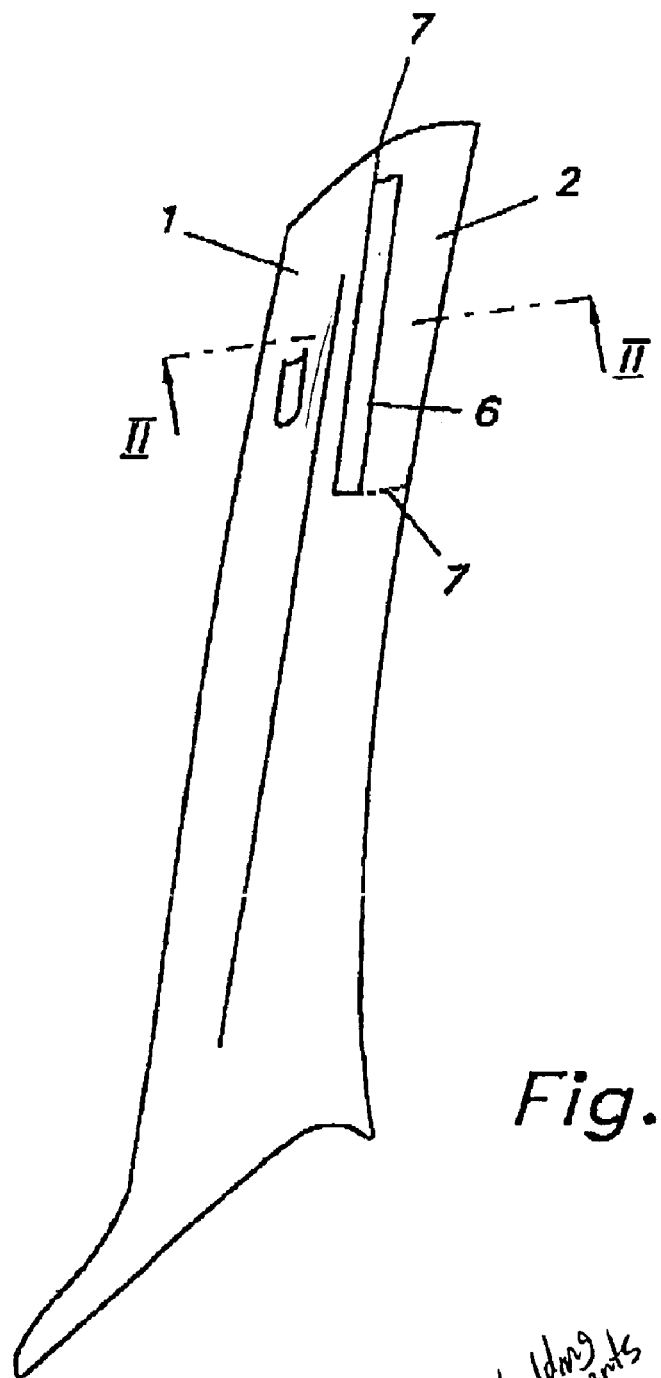
FIG. 1 shows a plan view of a lining for columns of automobiles according to the invention.
Figure 2:
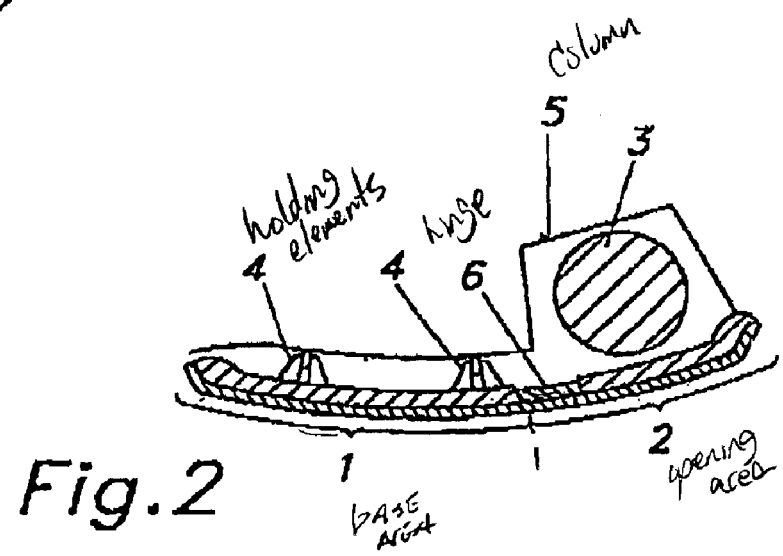
FIG. 2 shows an enlarged cross-sectional view of the lining for columns of automobiles taken along line II—II of FIG. 1.

The column lining illustrated in FIGS. 1 and 2 has a base area 1 and an opening area 2, the opening area 2 covering an airbag 3, for example. As can be seen from FIG. 2, the base area 1 has fixing and holding elements 4, with which the lining part can be fixed to the column 5 of the automobile. The opening area 2 largely consists of a thermoplastic material with a Shore A hardness greater than 100, only a hinge area 6 adjoining the base area 1 consists of a softer thermoplastic material with a Shore A hardness of less than 90.

The hinge area 6 may reach as far as the outer edge of the lining part or, as illustrated in FIG. 1, can have intended fracture lines or wall thickness reductions 7 adjoining the hinge area 6.

The hinge area advantageously consists of a thermoplastic material with a Shore A hardness between 30 and 95, preferably with a Shore A hardness between 60 and 80.

Suitable materials for the base area 1 are, in particular, thermoplastics from the group comprising polypropylene, ABS and ABS-polycarbonate blends.

Suitable materials for the hinge area 6 are, in particular, thermoplastic elastomers or elastomer alloys of thermoplastics and elastomers.

The base area 1 and the opening area 2, together with the hinge area 6, can preferably be covered by a unified decorative layer.

What is claimed is:

1. A lining for columns of automobiles, comprising:
   a base area,
   an opening area for covering an airbag, and
   a hinge area disposed between and adjoining the base area and opening area,
   wherein the hinge area is coplanar along a surface of the base area and the opening area, and
   wherein the hinge area is made of a material having a different hardness than the base area and the opening area.

2. The lining as claimed in claim 1, wherein the opening area is further bounded by intended fracture lines or wall thickness reductions adjoining the hinge area.

3. The lining as claimed in claim 1, wherein the hinge area consists essentially of a thermoplastic material with a Shore A hardness between 30 and 95.

4. The lining as claimed in claim 3, wherein the hinge area consists essentially of a thermoplastic material with a Shore A hardness between 60 and 80.

5. The lining as claimed in claim 1, wherein the base area and the opening area together with the hinge area are covered by a unified decorative layer.

6. A lining for columns of automobiles, comprising:
   a base area, and
   an opening area for covering an airbag, wherein the opening area is coplanar along a surface of the base area and comprises a first material having a first hardness, except for a hinge area comprising a second material having a second hardness being different than said first hardness.

7. The lining as claimed in claim 6, wherein the base area has at least one fixing element.

8. The lining as claimed in claim 6, wherein the second material is thermoplastic.

9. The lining as claimed in claim 6, wherein the opening area is further bounded by intended fracture lines or wall thickness reductions adjoining the hinge area.

10. The lining as claimed in claim 6, wherein the second hardness is less than the first hardness.

11. The lining as claimed in claim 10, wherein the second material further has a Shore A hardness between 30 and 95.

12. The lining as claimed in claim 10, wherein the second material further has a Shore A hardness between 60 and 80.

13. The lining as claimed in claim 6, wherein the base area and the opening area together with the hinge area are covered by a unified decorative layer.

14. A trim panel having an inner surface and an outer surface, comprising:
- a base portion,
- an opening portion, and
- a hinge portion disposed between and adjoining the base portion and the opening portion,
- wherein at least one of the inner surface and the outer surface is coplanar, and
- wherein the hinge portion is made of a material having a different hardness than the base portion and the opening portion.

15. The trim panel as claimed in claim 14, wherein the base portion and the opening portion is made of the same material.

16. The trim panel as claimed in claim 14, wherein the opening portion is made of a thermoplastic material having a Shore A hardness greater than 100.

17. The trim panel as claimed in claim 14, wherein the hinge portion is made of a thermoplastic material having a Shore A hardness less than 90.

18. The trim panel as claimed in claim 14, wherein the hinge portion is made of a thermoplastic material having a Shore A hardness between 30 and 95.

19. The trim panel as claimed in claim 14, wherein the base portion is made of a thermoplastic material having a Shore A hardness greater than 100.

20. The trim panel as claimed in claim 14, wherein the base portion, the opening portion and the hinge portion are covered by a decorative layer.

21. The trim panel as claimed in claim 14, wherein the hinge portion is adhered to the base portion and the opening portion.

22. The lining as claimed in claim 1, wherein the hinge area is adhered to the base area and the opening are.

23. The lining as claimed in claim 6, wherein the hinge area is adhered to the base area and the opening area.

* * * * *